No. 736,522. PATENTED AUG. 18, 1903.
H. A. HOPKINS.
ICE CREAM CABINET.
APPLICATION FILED APR. 18, 1903.

NO MODEL.

Witnesses.
J. E. Maloney
F. P. Spaulding

Inventor.
Heber A. Hopkins
by J. E. Teschemacher
Atty.

No. 736,522. Patented August 18, 1903.

UNITED STATES PATENT OFFICE.

HEBER A. HOPKINS, OF CAMBRIDGE, MASSACHUSETTS, ASSIGNOR TO AMERICAN SODA FOUNTAIN COMPANY, OF JERSEY CITY, NEW JERSEY, A CORPORATION OF NEW JERSEY.

ICE-CREAM CABINET.

SPECIFICATION forming part of Letters Patent No. 736,522, dated August 18, 1903.

Application filed April 18, 1903. Serial No. 153,328. (No model.)

*To all whom it may concern:*

Be it known that I, HEBER A. HOPKINS, a citizen of the United States, residing at Cambridge, in the county of Middlesex and State of Massachusetts, have invented an Improvement in Ice-Cream Cabinets, of which the following is a specification.

My invention has for its object to facilitate the serving of ice-cream from a cabinet or storage-receptacle; and it consists in an ice-cream cabinet provided with a cover adapted to be raised by the foot to afford access to the ice-cream jar or receptacle within, the dispenser being thereby enabled to hold a tumbler or dish in one hand and a scoop or spoon in the other and without laying down either open and close the cabinet for the purpose of serving the cream.

Figure 1:
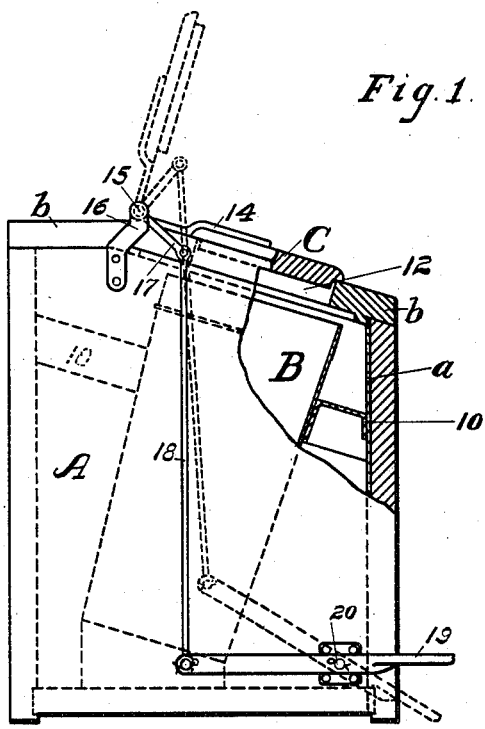
Figure 2:
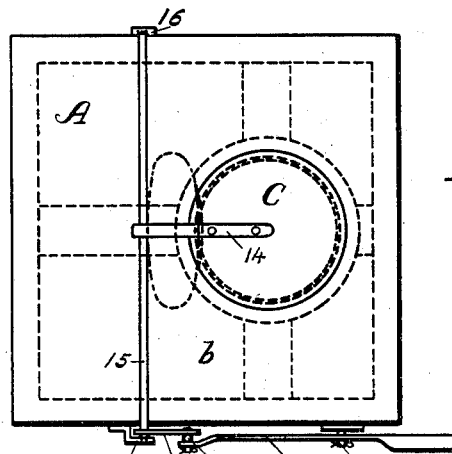

In the accompanying drawings, Figure 1 is a sectional side elevation of an ice-cream cabinet constructed in accordance with my invention. Fig. 2 is a top view of the same.

In the said drawings, A represents an outer casing or cabinet, which is provided with a suitable sheet-metal lining $a$ and is adapted to contain the ice and salt, which are packed as usual around the jar, can, or other receptacle B for containing the ice-cream, said receptacle being supported in its proper position by means of brackets 10, projecting from the interior of the cabinet, as shown in Fig. 1. In the removable top $b$ of the casing A directly over the upper end of the ice-cream jar B is formed an opening 12, to which is applied a close-fitting hinged cover C, preferably provided with a flange, and to this cover is secured an arm 14, fast on a horizontal rock-shaft 15, supported in bearings in lugs 16, projecting from the top of the casing A. One end of the shaft 15 is provided with a crank-arm 17, to the outer end of which is pivoted a connecting-rod 18, the lower end of which is pivoted to the inner arm of a foot-lever or pedal 19, fulcrumed at 20 on a stud projecting from the side of the casing A, the mechanism being so arranged that when the free or outer end of the pedal is depressed by placing the foot thereon the cover C will be raised, as shown in dotted lines in Fig. 1, thus affording convenient access to the ice-cream jar B, from which the cream may then be taken in the usual manner by the dispenser. On removing the foot from the pedal the cover C will fall into place by its own gravity, and thus automatically close the opening 12 to exclude the warm outside air without any care on the part of the dispenser. By thus operating the cover of the cabinet by means of a foot-lever or pedal it will be obvious that the person desiring to serve the ice-cream will be enabled to hold the spoon or scoop in one hand and the tumbler or dish in the other and without laying down either open the cabinet and remove the cream, and as the cover will close automatically, as described, the moment the foot is removed from the pedal all liability of the cabinet being accidentally left open to the detriment of the cream within is entirely avoided.

What I claim as my invention, and desire to secure by Letters Patent, is—

An ice-cream cabinet comprising a box or casing A having a removable top $b$ provided with an opening 12, an ice-chamber within the casing, a swinging cover C adapted to fit the opening in the top of the casing, a rock-shaft 15 extending transversely across the top $b$ and mounted in bearings projecting from the top of the casing and provided with an arm 14 connected with the cover, and at one end with a crank-arm 17, a foot-lever 19 pivoted to the side of the box or casing and a connecting-rod 18 extending from the foot-lever to the crank-arm of the rock-shaft, all constructed and arranged to operate substantially as described.

Witness my hand this 14th day of April, A. D. 1903.

HEBER A. HOPKINS.

In presence of—
P. E. TESCHEMACHER,
F. B. SPAULDING.